UNITED STATES PATENT OFFICE.

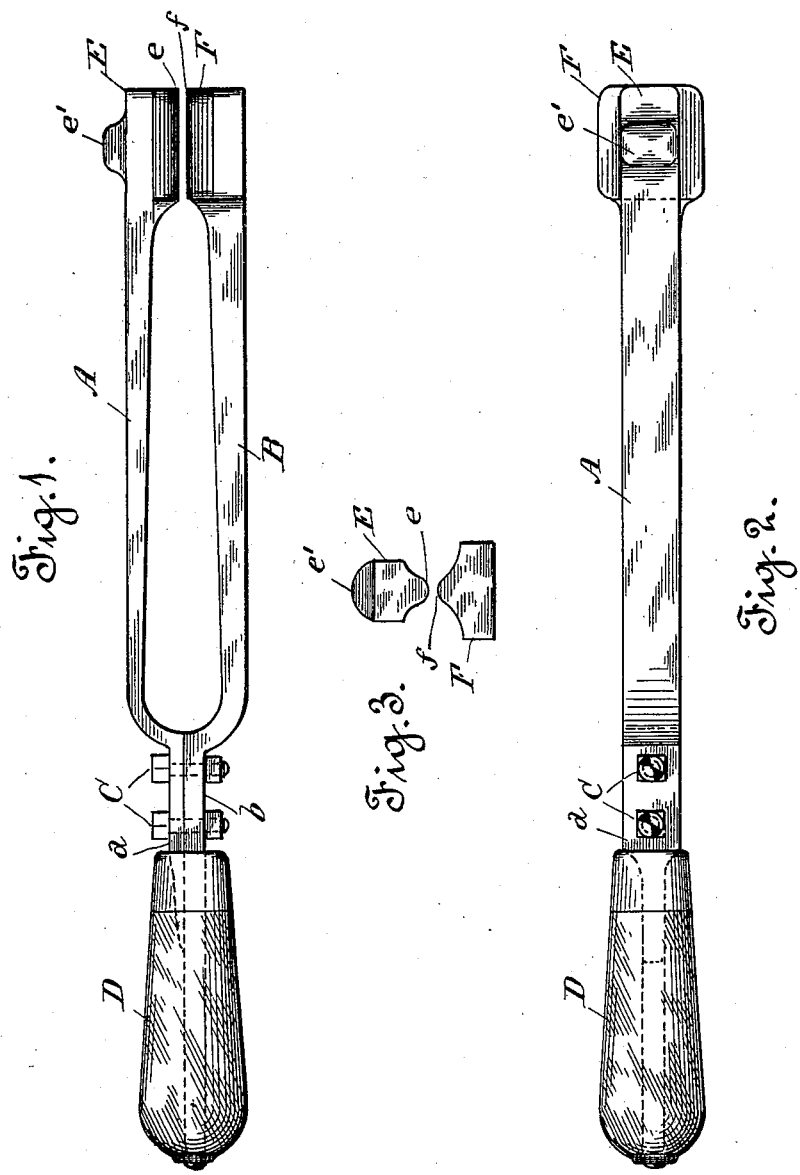

AMOS OCTAVE PATENAUDE, OF KORBEL, CHARLES JOHN ANDERSON, OF EUREKA, AND JOHN ADOLPH ANDERSON, OF FALK, CALIFORNIA.

SAW STRAIGHTENING AND TENSIONING HAMMER.

SPECIFICATION forming part of Letters Patent No. 693,060, dated February 11, 1902.

Application filed August 12, 1901. Serial No. 71,679. (No model.)

*To all whom it may concern:*

Be it known that we, AMOS OCTAVE PATENAUDE, of Korbel, CHARLES JOHN ANDERSON, of Eureka, and JOHN ADOLPH ANDERSON, of Falk, in the county of Humboldt, State of California, have invented a new and useful Saw Straightening and Tensioning Hammer; and we do hereby declare that the following is a full, clear, and exact description of the same.

Our invention relates to saw-blade straightening and tensioning tools or devices.

In the process of straightening, leveling, and tensioning saw-blades, especially bandsaws, wherein much skill and judgment are involved, the apparatus and tools at present in use comprise a steel-faced anvil, a leveling-block, a bench, supporting-rollers for the blade, a stretcher-roller, hammers, both dog-head and cross-face, back gage, and leveling straight-edge. These are used by supporting the saw on the rollers and bench, leveling it on the block, testing it with the straight-edge to find the lumps, bends, ridges, and twists, hammering with the cross-face hammer to remove these, testing it to find the "fast," "loose," and "stiff" spots or places, and hammering with the dog face or tensioning hammer to remove such spots or places. In the use of these hammers great care must be taken to hammer both sides of the saw alike to prevent driving the saw through or dishing it. The saw must be perfectly flat on both sides.

The objects of our invention are to provide for the treatment of both sides of the saw-blade equally and at one operation and to avoid the necessity of turning the blade over on the anvil.

To these ends our invention consists in a tool comprising a pair of superposed separated shanks united at their rear ends, each of said shanks having at its forward end a hammer-head, the operative faces of the two heads being separated and lying in the same plane, as we shall now fully describe by reference to the accompanying drawings, in which—

Figure 1 is a side view of the tool. Fig. 2 is a top view of same. Fig. 3 is an end view of the hammer-head end of the tool.

A is the upper shank, having at its rear end a stem *a*.

B is the lower shank, having at its rear end a stem *b*.

The stems *a* and *b* are secured together by bolts C, by the removal of which the shanks may be taken apart. A suitable handle D is fitted upon stem *b*.

The forward end of shank A is provided with a hammer-head E, the operative or working face *e* of which is made of suitable shape for straightening and tensioning. The head E has on its top a suitable impact-lug *e'* to receive a blow. The lower shank B has at its forward end a hammer-head F, the working face *f* of which is suitably shaped and lies in the plane of the working face *e* of hammer-head E. The two faces are separated, as shown in Figs. 1 and 3, and the lower head F is best made wider than the upper head in order to form a firm bearing to rest solidly on the anvil. The shank A near the rear end is of a springy nature.

The use of this tool is as follows: The saw-blade is raised, say, about an inch from the anvil by means of blocks under it on each side of the anvil. Then the tool is slipped upon the blade, which passes between the separated heads and shanks until the spot or place on the blade to be treated is reached and lies between the two heads. In this position the lower head F is under the blade and rests solidly on the anvil, while the upper head E lies above the blade. A blow with an ordinary hammer is then delivered on the upper head, and the blade being between the two heads both sides of it are hammered alike or equally by this single operation and without the necessity of turning the blade over on the anvil.

With this tool the saw is stretched on both sides without dishing it or driving it through, and all its fast spots may be opened up and the tension evened and the saw remain perfectly level.

Having thus described our invention, what we claim as new, and desire to secure by Letters Patent, is—

A tool of the character described comprising a single handle, oppositely-arranged hammer-heads both supported by said handle, one of said hammers being yieldable relative to the other, and an outer contact portion on one of the heads adapted to receive a blow from a hammer or the like, substantially as described.

In witness whereof we have hereunto set our hands.

AMOS OCTAVE PATENAUDE.
CHARLES JOHN ANDERSON.
JOHN ADOLPH ANDERSON.

Witnesses:
JOSEPH E. MERRIAM,
GEORGE F. TEAL.